United States Patent [19]
Nablo

[11] 3,780,308
[45] Dec. 18, 1973

[54] PROCESS AND APPARATUS FOR SURFACE STERILIZATION OF MATERIALS

[75] Inventor: Sam V. Nablo, Lexington, Mass.

[73] Assignee: Energy Sciences, Inc., Burlington, Mass.

[22] Filed: June 7, 1971

[21] Appl. No.: 150,464

[52] U.S. Cl. .............................. 250/492, 250/493
[51] Int. Cl. ............................................ H01j 37/00
[58] Field of Search ...................... 250/49.5 TE, 43; 21/102; 99/253

[56] References Cited
UNITED STATES PATENTS
| | | | |
|---|---|---|---|
| 3,617,740 | 11/1971 | Skillicorn | 250/49.5 TE |
| 3,654,459 | 4/1972 | Coleman | 250/49.5 TE |
| 2,855,517 | 10/1958 | Rainer | 250/49.5 TE |
| 2,384,778 | 9/1945 | Whitman | 250/43 |

Primary Examiner—James W. Lawrence
Assistant Examiner—C. E. Church
Attorney—Rines and Rines

[57] ABSTRACT

This disclosure deals with the surface sterilization and/or surface treatment of containers and other articles the walls of which have a high specific energy absorption for relatively low energy electrons, by transmitting such low energy electrons to such containers as they move through a sterile gaseous zone, only slightly to penetrate the container walls to effect surface sterilization or treatment thereof, while substantially absorbing the electrons within the walls to minimize X-ray generation.

17 Claims, 7 Drawing Figures

ASEPTIC FILLING APPLICATION

ASEPTIC FILLING APPLICATION

INTEGRATED AIR AND FILLING SPOUT STERILIZATION HEAD

PRE-FORM SURFACE STERILIZATION
OF CONTAINER MATERIAL

PROCESS AND APPARATUS FOR SURFACE STERILIZATION OF MATERIALS

The present invention relates to processes and apparatus for surface sterilization, being more particularly directed to the use of intense energetic electron beams for the sterilization and other treatment of material surfaces, particularly those used for the packaging of sterile or pasteurized goods and the like.

It has heretofore been proposed to sterilize paper, glass and plastic containers and the like with the aid of infrared, ultraviolet and microwave radiation. Reference may be made, for example, to Hsu, D. S., "Ultra High Temperature Processing and Aseptic Packaging of Dairy Products," Damana Tech., Inc., N. Y., 1970; Lawrence, C. A. et al., "Disinfection, Sterilization and Preservation," Lea and Febiger, Phila., Pa., 1968; and Richards, J. W., "Introduction to Industrial Sterilization," Academic Press, N. Y., 1968. Such techniques have not found commercial success because of the deleterious material damage which results in the case of infrared heating and the gross inefficiencies of the ultraviolet and microwave techniques. As a consequence, resort has been had to the use of chemical disinfectants such as $H_2O_2$, $Cl_2$ or ethylene oxide, usually with high pressure air at high temperatures to purge the package surface of the chemical disinfectant. This technique, however, results in a complicated, relatively slow process which is not well suited for high speed packaging applications where sterilization times of less than a second are desired without the dwell times demanded by air or thermal drying. 2

Still another physical method for the destruction of micro-organisms has been used for some time in bulk sterilization; namely, gamma or X-ray radiation. Early suggestions of this nature are described, for example, In U.S. Letters Pat. Nos. 2,429,217 and 2,456,909 to Brasch. Unfortunately, most sources of such radiation (typically $Co^{60}$ and accelerator sources, respectively) are insufficiently intense to permit high speed sterilization of large areas at the dose levels of 1.5 to 4.5 megarads typically demanded for the application. In addition, higher energy sources are advantageously required for this purpose since the efficiency of generation of X-rays rises as the 2.9 power of the machine voltage and does not rise to useful conversion efficiencies of a few percent until energies well above 1 Mev. are generated in the accelerator. Such high energy X-rays can lead to certain neutron-producing reactions in matter [$\gamma$, $n$) or photoneutron reactions] which can lead to deletereous activation of the irradiated or sterilized material. This problem has been studied in detail and, although generally a small effect, is clearly one which the sterilization process should not introduce.

An object of the present invention, accordingly, is to provide a new and improved process and apparatus for surface sterilization and/or treatment that shall not be subject to the above-described disadvantages.

It has been found, in accordance with the present invention, indeed, that an improved practice for the sterilization of matter may directly utilize energetic electrons and at lower energies, so that the following advantages may accrue:

i. The inefficiencies involved in the conversion of the kinetic energy of energetic electrons to bremsstrahlung or X-rays need not be suffered, resulting in high process power efficiency. Direct electron acceleration systems can work at over 90 percent power efficiency.

ii. The problems implicit in the use of high energy systems of one-half a megavolt and above need not be countered. The main problems here are machine size, complexity, cost and shielding, the latter becoming a very severe problem for operating personnel safety in high power installations.

iii. The electron beams can be shaped and directed to the surface or surfaces to be treated, resulting in further energy utilization efficiency.

iv. High process rates are possible since the electron beams, transported directly to the workpiece article from the accelerator, can be delivered at very high current density. Since the dose required for sterilization or pasteurization or like process is measured in terms of the energy absorbed per unit mass of material, the current density or energy flux at the workpiece surface clearly controls the rate of treatment of that surface. In accordance with the invention, intense relativistic electron beams provide energy at extreme flux levels, well above those achievable by any other non-nuclear technique, producing a broad and completely predictable range of dose delivery rates.

v. Decreased workpiece damage results from high rate radiation processing. Comparative testing of common packaging materials has shown this to be the case at the same (sterilizing) doses from $Co^{60}$ at 100 rads/sec. As a result, both improved surface and bulk properties result in most polymeric materials when radiation processing in conducted at high radiation rates while the same bactericidal efficacy is retained. A comparison of material elongation characteristics for $Co^{60}$ and electron radiation at high radiation rates demonstrates this:

|  | Ultimate Strength | Ultimate Elongation |
|---|---|---|
| Control (Polystyrene) | 42.6 lbs/in. | 88.6% |
| $Co^{60}$ Irradiated (100 rads/sec.) | 40.6 | 77.0% |
| Electron Irradiated ($10^{13}$ rads/sec) | 48.0 | 94.8% |
| Control (Polyethylene | 46.2 lbs/in. | 135.5% |
| $Co^{60}$ Irradiated (100 rads/sec.) | 39.1 | 105.0% |
| Electron Irradiated ($10^{13}$ rads/sec.) | 41.0 | 136.7% |

A further object of the invention, accordingly, is to provide such a novel process and apparatus with relatively low energetic electron beams matched to the energy absorbing characteristics of the article surfaces and operating with high efficiency, negligible workpiece article damage and improved characteristics, and minimal X-ray generation.

Other and further objects will be explained hereinafter and are more particularly pointed out in the appended claims. In summary, from one of its broad aspects, the invention contemplates only slight pentration of the relatively low energy electrons within the article walls to effect surface sterilization thereof and substantial absorption within the walls that minimizes X-ray generation, and maintaining the gaseous zone in which the electron beam irradiates the article, substantially sterile.

The invention will now be described with reference to the accompanying drawings, FIGS. 1 and 2 of which are graphs showing electron dose and penetration range variations in typical packaging material;

Figure 5A:
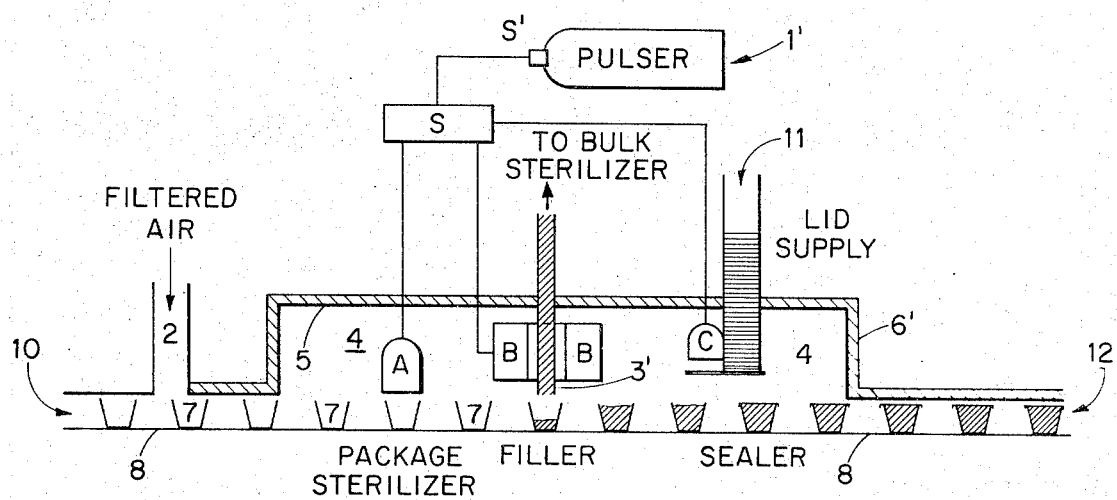

and FIGS. 5(a), (b) and (c) are similar views of aseptic filling systems incorporating the invention.

Figure 1:
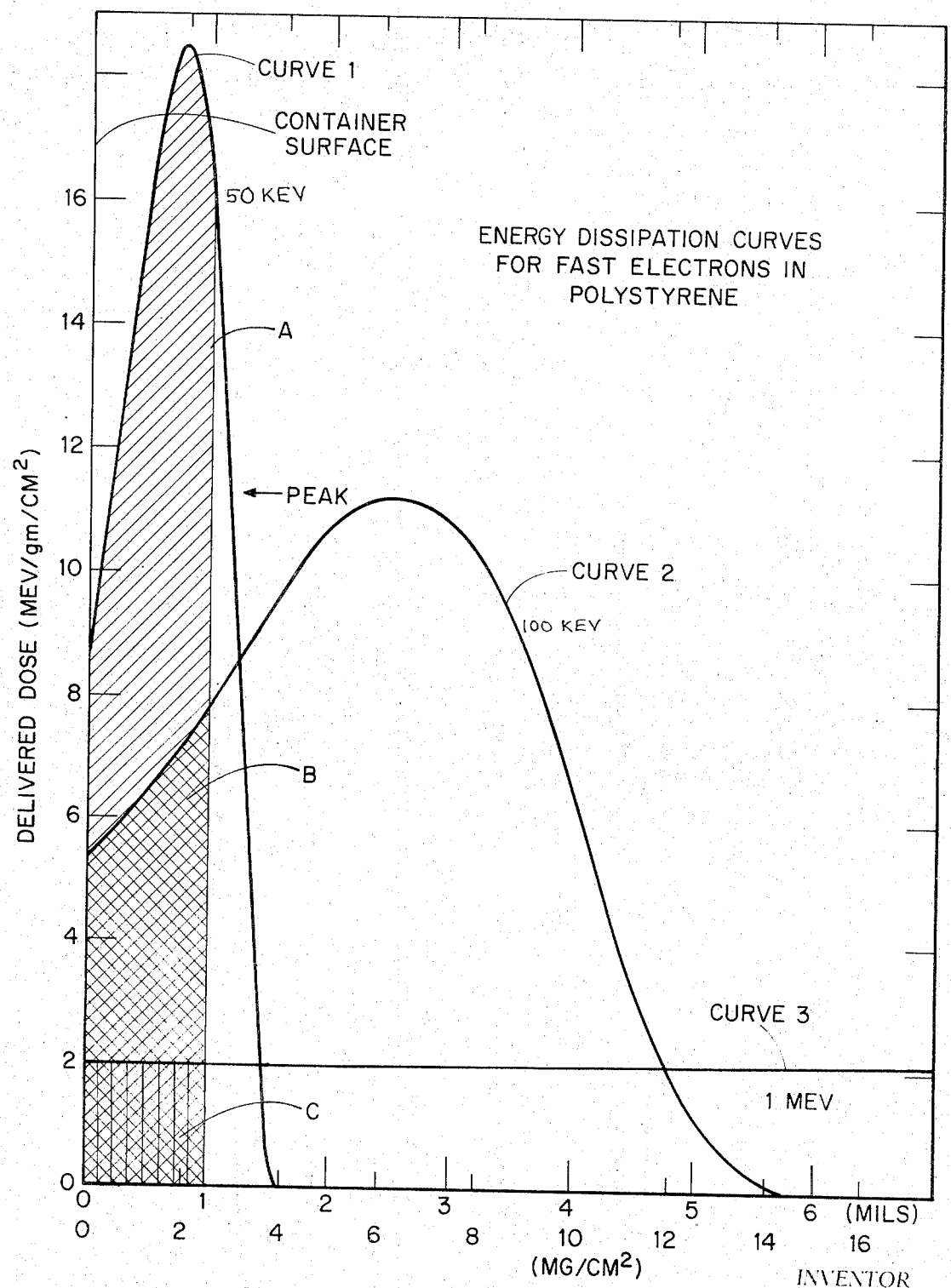

A most important feature of the surface sterilization technique underlying the invention is the increased efficiency of low energy electron beams for such applications, both for sterilization and like treatment involving microorganisms (pasteurization, disinfestation, etc.), as well as radiation chemistry treatment (cross-linking, polymerization, vulcanization, etc.) applications. This feature is demonstrated in the curves of FIG. 1, in which the energy dissipation or dose distribution curves for fast electrons in polystyrene are plotted as a function of depth of penetration. Curve 1 shows the absorption behavior characteristic of 50 keV electrons; curve 2 relates to 100 keV particles; and curve 3 is concerned with a 1 million electronvolt beam. The ordinate of the graph of FIG. 1 provides a measure of the deliverd dose per incident electron in units of energy deposited per unit thickness of material (polystyrene in this illustration). The abscissa shows the electron penetration depth both in English units (thousandths of an inch) and in metric units of target thickness (mass per unit area). The origin of the abscissa corresponds to the material surface. The very limited penetration depth of 1.5 mils of the 50 keV beam (curve 1) is accompanied by very high specific absorption or dose delivery to the polystyrene or like article material. Energy dissipation data such as these are available as, for example, in NBS Monograph No. 1, "Energy Dissipation by Fast Electrons," L. V. Spencer, U. S. Gov't Printing Office, Washington, D. C., Sept. 10, 1959, over a broad range of electron energies and target materials. As shown in FIG. 1, the maximum electron penetration in the target material varies as the electron energy; e.g. for the 50 keV, the depth of penetration is 1.5 mils; 5.6 mils for 100 keV; and 174 mils for 1,000 keV. If we consider a 25 micron or one mil layer, as an example, the absorption region for each of the three curves over this "shallow" penetration is given by the cross-hatched areas A, B and C respectively for curves 1, 2 and 3. Over the 1 mil region of interest (for surface treatment, for example), the average stopping power or energy dissipation for the 50 keV case (A) is seen to be 15 MeV/gm/cm$^2$; or, for unit density material such as polystyrene, polyethylene, or like polymeric material, a total beam loss in the 1 mil layer (2.5 mg/cm$^2$) of 38 keV is realized. This is 76 percent energy transfer efficiency for the 50 keV system. This can be compared with the average stopping power of 6.5 MeV/mg/cm$^2$ at 100 keV (curve 2) or, a beam loss of 16.5 keV; i.e. 16.5 percent energy transfer efficiency for this case. These figures can now be compared with the energies used in earlier practice, say the 1,000 keV behavior shown by curve 3. Here, the average stopping power or rate of loss of energy has dropped to 2 MeV/gm//cm$^2$ or a beam energy loss of only 5 keV for the same film thickness; i.e. 0.5 percent energy transfer efficiency for this case. As shown in the graph of FIG. 2, later discussed, this utilization efficiency drops further as the beam energy increases.

It will thus be observed that for relatively thin surface sections or thin films, dropping the energy of the beam by a factor of 10 (1 MeV to 100 keV) gives the surprising result of having increased the efficiency of the beam for sterilization or other treatment of that section by a factor of 16.5:0.5, or by a factor of 33; this has increased to a factor of over 150 for an energy decrease by a factor of 20. This advantage in the latter case can also be stated in terms of the fact that at the same current density in the electron beam, the dose delivered has risen by a factor of 7.5 at 20 times lower power level.

While this idealized argument neglects window absorption losses, these are, however, small even for these low energy systems. For example, in the case of a 0.0005 inch (5,7 mg/cm$^2$) Titanium window with a 150 keV system, the beam energy loss in the window is 20 keV. Reduced loss can be achieved for large area extended geometries through the use of supported lower Z (e.g., Al, Be) window structures.

Figure 2:
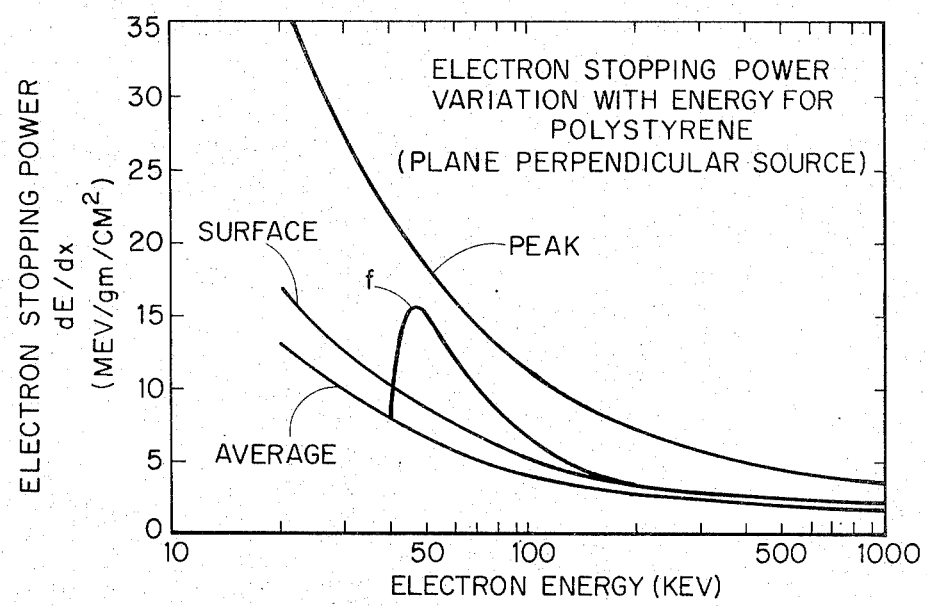

A comparative examination of the relative absorption or electron stopping power variation in the polystyrene film example is shown as a function of incident electron energy in FIG. 2. As shown in the characteristic curves of FIG. 1 for the same material, the stopping power, for a plane perpendicular source, will increase from the surface to some peak value and then tail off to zero at the end of the range of penetration of the electron. In general, then, for thin sections (e.g. the 0.001 inch thickness used in FIG. 1), the electron will deliver energy in a manner characterized by a stopping power lying between the surface and the peak figures. In FIG. 1, indeed, the average value of 15 MeV/gm/cm$^2$ characterized the 50 keV beam of curve 1 in the 0.001 inch layer.

In FIG. 2, the "average," "surface" and "peak" stopping power values for energetic electrons in a typical bulk polymer are plotted as a function of energy. Curve $f$ is plotted to show the average variation in a 0.001 inch film of the same material over the same energy range. The advantage of using low energy electrons is again demonstrated by the very rapid increase in average energy dissipation in the film, which, as shown by curve $f$, occurs as the energy is decreased from 150 keV down to the energy corresponding to "bare penetration" (40 keV), where curve $f$ once again meets the "average" dissipation curve. A family of such curves $f$ can be plotted in a like manner for a range of film thicknesses, demonstrating a peaking at lower energies with closer approach to the "peak" energy dissipation curve as the film thickness decreases.

In view of the limited penetration capability of fast electrons under, say, 300 keV kinetic energy, some consideration must be given the tolerable path lengths of such beams in air as they pass from the evacuated acceleration system of the processor to the surface to be sterilized which is preferably located in the ambient environment (or in $N_2$ or similar inert gas blanket at atmospheric pressure).

Figure 3:
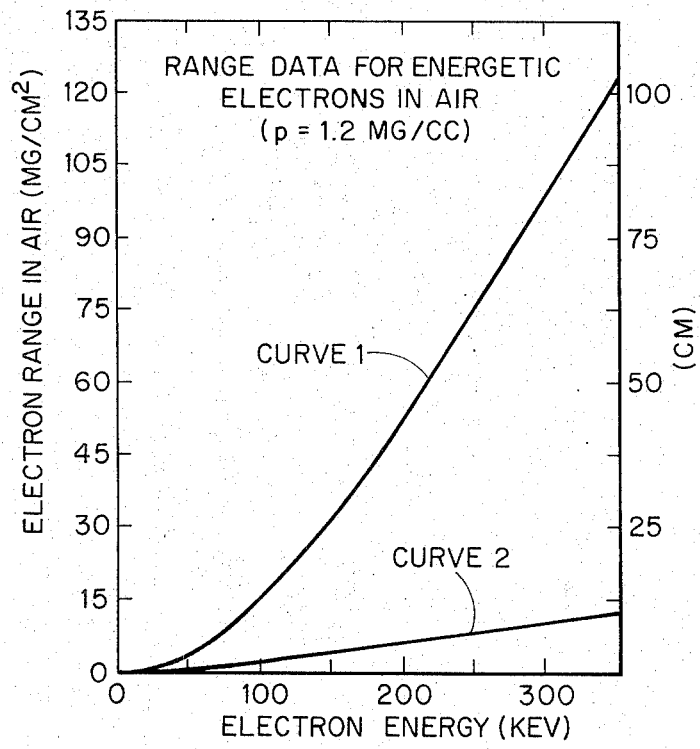
FIG. 3 is a graph showing electron penetration ranges in air, the knowledge of which is important for efficient practice of the process taught herein.

Range data for electrons in dry air are presented in FIG. 3, in which the penetration depth (residual range) for electrons is plotted as a function of electron energy in curve 1 thereof. Since this curve is the limiting case for which the full electron energy has been dissipated "in transport," curve 2 has been plotted for a tolerable 10 percent loss case; i.e. curve 2 shows the accelerator window-surface separation distance for which an electron of energy E would dissipate 10 percent of its energy in transit. As shown on curve 2, separation distances of 2.5 centimeters or 1 inch are possible at 125 keV, while a beam energy of 75 keV would require a practicable 1 cm air path to hold losses to this 10 percent figure.

Figure 4:
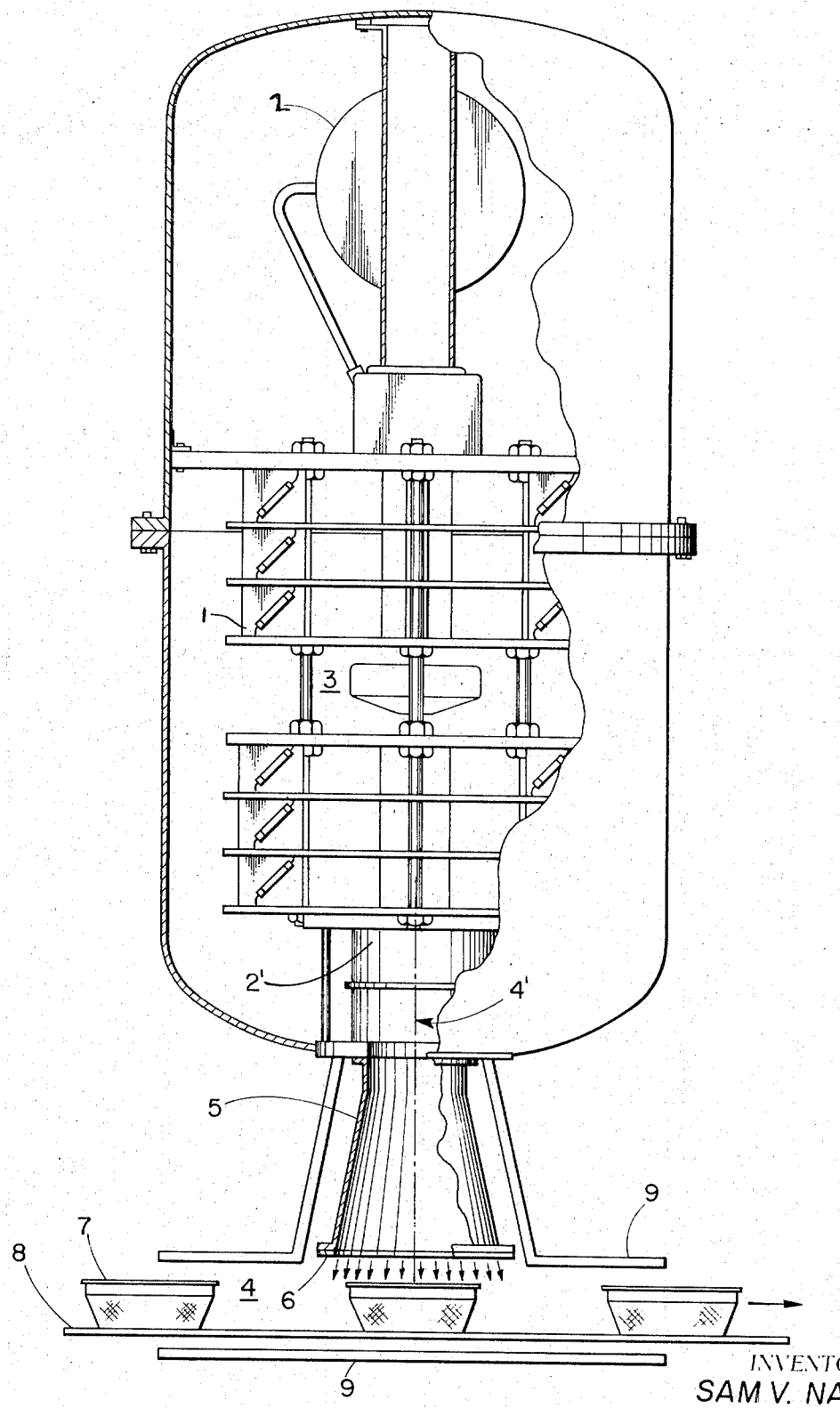
FIG. 4 is a longitudinal section of a preferred apparatus for practicing the process of the invention.

This invention may utilize both direct current and pulsed beams since the use of such relatively low energy streams, even at modest current densities (e.g. 100keV at 100 $\mu$amperes/cm$^2$), can provide surface dose rates of $10^8$ rads/second due to the elevated specific energy absorption. The rate of irradiation is elevated some 5 to 6 orders of magnitude ($10^{13}$ to $10^{14}$ rads/sec.) through the use of high intensity pulsed beams employing large area cold cathode techniques similar to those described by S. Nablo et al., "Observations of Magnetically Self-Focusing Electron Streams," Appl. Phys. Lett., 8, No. 1, 18 (1966). Using such techniques, large area intense beams can be delivered directly into air with pulse durations typically of 10–100 $\times 10^{-9}$ seconds and dose rates of $10^{14}$ rads/sec. The adaptation of such techniques to the present invention is shown in FIG. 4, in which a capacitor system 1 is charged to $\pm$ 100,000 VDC by a transformer system 2 and switched via a triggered gap 3 to provide microsecond or shorter pulses, say 60 nanosecond, 15,000 ampere electron beam 4' at 125keV maximum energy through the window 6. The high reactance type current limiting transformer is preferably of the type described for example, in "Electronic Transformers and Circuits," p. 210–212, Reuben Lee, John Wiley and Sons, N.Y., 1947. The storage or discharge system may be a simple L-C-R circuit in which $R >> \sqrt{L/C}$, described, for example, in "Electronic and Radio Engineering," Ch. 3, F. E. Terman, McGraw Hill Inc., N. Y., 1955. The triggered or command fired rotary switch is used to introduce synchronized sterilization control with the remainder of the packaging system. It may be of the type described, for example, in "Pulse Generators" by G. N. Glasoe and J. V. Lebacqz, p. 275–294, McGraw-Hill Book Co., Inc., N. Y., 1948. Relatively low energy beams of from 50–200 kilovolts are suitable for these applications. Such a sterilizer, delivering approximately 100 joules of energy per pulse can readily sterilize 400 cm$^2$ surface area of proximal containers of similar articles 7 carried past the irradiation system by a conveyor 8, at dose levels of 1.5 megarads and at repetition rates of 4 per second; i.e. 1,600 cm$^2$/second. The average power consumption of the system is 500 watts, and it may be insulated at one atmosphere of dry N$_2$ or SF$_6$ and can be readily shielded with one-fourth inch of lead 5 enclosing the beam area. By using such relatively low energy electrons in conjunction with high specific energy of absorption container walls, as of polystyrene and the like, before discussed, the wall surfaces are sterilized with the energy absorbed within the walls after slight penetration, minimizing the generation of X-rays, the few of which that are generated being shielded against by relatively thin lead shields 9 along the path or line of movement of the containers.

A further refinement of this invention for sterile or aseptic packaging applications utilizes the very high yields of ozone (O$_3$) which results from the application of the system under aerobic conditions. The disinfecting properties of the ozone so generated will be used to maintain a sterile condition on the process system walls as well as throughout the aseptic filling, sealing and product handling volume, as more particularly shown in the gaseous irradiation zone 4 of FIGS. 4 and 5(a).

A second variation would involve the use of inert or anaerobic gas blanket, such as N$_2$ or argon, to reduce oxygen inhibition or deterioration effects at the surface processed, and to provide energetic X-rays excited from the inner shell excitation of vacancies created by the primary electrons. These secondary X-rays are emitted isotropically and will assist in the surface sterilization of the entire area and help maintain a condition of sterility throughout the working zone volume 4 of the aseptic packager. A third variation may utilize the surface sterilizer itself to sterilize the ambient environment (gases) as well, for volume protection. A variation can utilize the surface sterilizer to maintain aseptic conditions on the container filler surface. A fifth variation may utilize an ultraviolet-rich gas, such as xenon, in the working zone volume 4 in order to enhance system surface sterilization by the intense ultraviolet bursts generated by the directed low energy beam.

The system shown in FIG. 4 will be demand-controlled by the package dispenser which delivers the sterile package 7 to the system prior to filling. As shown in FIG. 5(a), however, the same supply may control several beam heads for intermediate processing in the aseptic filler zone 4. The aseptic packaging system of FIG. 5(a) consists of a central pulser or voltage supply 1' which is used sequentially to excite several sterilizing heads (A, B, C etc.) located in the aseptic filling and packaging zone 4. Selector switch S is employed to provide the excitation pulse to the desired sterilization head, sequentially from A, the package sterilization unit which processes the inner contact surface of the container by the method already described. For deep container geometries in which the air path restraints of FIG. 3 become troublesome, a coaxial head geometry may be used for insertion into the package itself for co-axial surface illumination. The sequencer switch then proceeds, for example, to sterilizer head B, shown in FIGS. 5(a) and (b) to be of coaxial geometry. Such a system is used to maintain the surface of the filler spout 3' in aseptic condition while in the retracted position on each operation. The sequence switch S then delivers excitation energy to head C for sterilization of the package cap itself and the sealing surfaces Master switch S' is normally used to synchronize the pulser output with the sequencer switch S and the remainder of the packager functions. S' may be of the well-known fast trigatron type unit, while S may be of the conventional slower rotary type configuration. The entire aseptic filling and packaging region 4 is surrounded by a low-Z enclosure or shroud 5 which is further shielded with a thin lead cover 6'. Containers 7 are carried through the filler/packager region on conveyor 8.

Figure 5B:
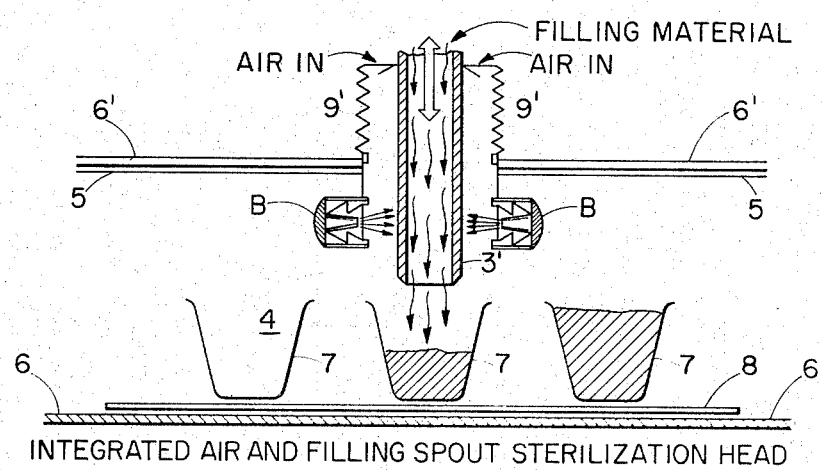

Aseptic conditions in the working volume 4 are accomplished by the use of high efficiency particle filtration of the air (as described, for example, in "Sterilization Filtration," C. W. Fifield, Ch. 45, Disinfection, Sterilization and Preservation, ed. C. A. Lawrence and S. S. Block, Lea and Febiger, Phila., 1968), so that a positive pressure of sterile air is maintained in zone 4. Another variation could utilize one of the sterilizer heads itself to sterilize air admitted from the packager environment. For example, as shown in FIG. 5(b), a coaxial head, such as B, may be used to treat air driven into region 4 during each operation of filler head 3'. In this way, only a few operations of heads A-C would be required to provide an aseptic zone 4 prior to start-up insertion of containers 7 at package sterilizer head A.

The slight positive pressure maintained in zone 4 by the action of bellows-valve 9' on filler head 3' would ensure that contaminated air leakage from exhaust channels 10, 11 and 12 was precluded. In the same manner that scattered electrons and direct u.v./X-ray excitation of the air assists package surface sterilization at head A, these same effects assist in the aseptic maintenance of zone 4 from the secondary effects of heads A and C.

Figure 5C:
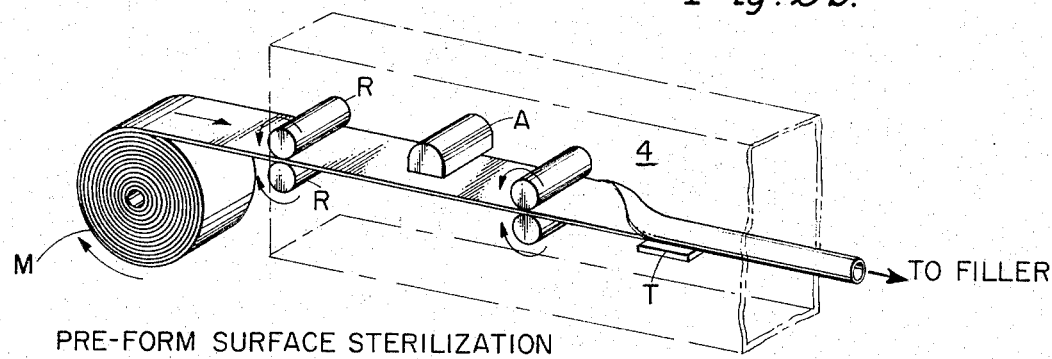

A further variation of this technique is particularly adapted for the continuous sterilization of material in strip form which is used in the fabrication of the container itself. A typical application is shown schematically in FIG. 5(c) in which a strip electron beam sterilizer A is employed to surface sterilize packaging material M fed into the tube sealing unit T in, for example, a "Tetrapak" unit (as described in "Aseptic Filling in Tetra-Pak Sterilization of Paper," P. Swartling and B. Lindgren, Milk and Dairy Research Report No. 66, Alnarp, Sweden). Such a unit may use roll separators R to seal the sterile zone 4 from the external septic environment and provide sterile stock M for conventional aseptic packaging systems while eliminating the wet (H$_2$O$_2$, etc.) disinfecting systems normally employed in current practice. Further modifications will also occur to those skilled in this art and all such are considered to fall within the spirit and scope of the invention as defined in the appended claims.

What is claimed is:

1. A process of achieving surface sterilization of a moving line of articles by utilization of low energy electrons with energy in the range of the order of from about 50 to about 150 keV at the surface of said articles, with article penetration depths of up to the order of about 6 mils and with energy transfer efficiency such that the electron energy is substantially completely absorbed within such penetration depths, the articles having walls of high enough specific energy absorption for said low energy electrons to provide said energy transfer efficiency, that comprises, moving said articles successively through a gaseous irradiation zone, generating a single substantially uniform large-area low energy electron beam and transmitting the same in said zone to said surface of said articles with said electron energies at said surface as said articles move through said zone, in order to cause said electrons to penetrate said article walls to said depths over such large area and to effect such surface sterilization with said substantially complete absorption within the walls that minimizes X-ray generation, and abosrbing such X-rays as may be generated in said zone along the line of movement of the articles therethrough.

2. A process as claimed in claim 1 and in which the further step is performed of maintaining the said zone substantially sterile.

3. A process as claimed in claim 1 and in which said articles are disinfested by exposure to said beam.

4. A process as claimed in claim 1 and in which said electron beam is pulsed.

5. A process as claimed in claim 4 and in which the electron beam pulses are adjusted to be of duration of the order of a micro-second and less.

6. A process as claimed in claim 1 and in which said electron beam generating step is repeated at successive spaced regions along said zone.

7. A process as claimed in claim 6 and in which said articles comprise containers and the containers are filled between such successive regions of said zone.

8. A process as claimed in claim 7 and in which the containers are closed after filling, with the closure subjected to a sterilizing electron beam at one of said regions of said zone.

9. A process as claimed in claim 1 and in which said articles comprise container material prior to formation into containers, and in which the further step is performed of forming the material, after the electron beam has penetrated the same, into containers while maintaining the containers sterile.

10. Apparatus for achieving surface sterilization of a moving line of articles by utilization of low energy electrons with energy in the range of the order of from about 50 to about 150 keV at the surface of said articles, with article penetration depths of up to the order of about 6 mils and with energy transfer efficiency such that the electron energy is substantially completely absorbed within such penetration depths, the articles having walls of high enough specific energy absorption for said low energy electrons to provide said energy transfer efficiency, that comprises, means for moving said articles successively through a gaseous irradiation zone, means for generating a single substantially uniform large-area low energy electron beam and transmitting the same in said zone to said surface of said articles with said electron energies at said surface as said articles move through said zone, in order to cause said electrons to penetrate said article walls to said depths over such large area and to effect such surface sterilization with said substantially complete absorption within the walls that minimizes X-ray generation, and means for absorbing such X-rays as may be generated in said zone along the line of movement of the articles therethrough.

11. Apparatus as claimed in claim 10 and in which means is provided for maintaining the said zone substantially sterile.

12. Apparatus as claimed in claim 10 and in which said articles comprise container material prior to formation into containers, and in which there is further provided container-forming apparatus for receiving the electron-beam treated material and forming a container therefrom while maintaining the container sterile.

13. Apparatus as claimed in claim 10 and in which said electron beam generating means comprises a plurality of successive electron guns and corresponding windows positioned to irradiate successive regions of said zone along the line of movement of said articles.

4. Apparatus as claimed in claim 13 and in which means is provided for successively pulsing the successive guns.

15. Apparatus as claimed in claim 10 and in which said articles comprise containers, and there are provided means for filling said containers as they move through the said zone while maintaining the containers sterile.

16. Apparatus as claimed in claim 15 and in which means is provided for subjecting the filling of said filling means to electron beam irradiation.

17. Apparatus as claimed in claim 16 and in which said last-named electron-beam irradiation subjecting means is coaxially disposed about said filling means.

* * * * *